United States Patent Office 3,480,518
Patented Nov. 25, 1969

3,480,518
SEPARATION OF NITROMETHANE AND NITROETHANE BY CO-DISTILLING WITH PENTANE
John B. Tindall, Terre Haute, Ind., assignor to Commercial Solvents Corporation, New York, N.Y., a corporation of Maryland
No Drawing. Filed Aug. 26, 1968, Ser. No. 755,439
Int. Cl. B01d 3/34
U.S. Cl. 203—70          4 Claims

ABSTRACT OF THE DISCLOSURE

A process for the separation of a mixture of nitromethane and nitroethane by adding pentane to the mixture, co-distilling the nitromethane and pentane, condensing and separating the distillate to produce purified nitromethane, and removing excess pentane from the distillation residue to produce nitroethane substantially free from nitromethane.

BACKGROUND OF THE INVENTION

This invention relates to a process for purifying nitromethane and nitroethane. In a particular aspect, this invention relates to a process for separating nitromethane from a mixture with nitroethane by co-distillation with pentane.

In the production of nitroalkanes by the vapor phase nitration of propane, four nitroalkanes are obtained in quantity, namely, nitromethane (NM), nitroethane (NE), 2-nitropropane (2–NP) and 1-nitropropane (1–NP), plus small amounts of nitrobutanes. Previously, the nitroalkanes were separated by fractionation. When the fractionation is conducted at atmospheric pressure, nitromethane is first distilled at about 101° C., then nitroethane at about 114° C. Commercial grade nitromethane obtained by this process analyzes 99% by wt. or more of total nitroalkane, but the purity is generally about 96%, the remainder being largely nitroethane and 2-nitropropane. Similarly commercial grade nitroethane may contain a substantial proportion of nitromethane. The present purity of these materials is satisfactory for many uses but in some, such as in making derivatives, it is desirable to be able to prepare nitromethane in a relatively high degree of purity.

In U.S. Patent 3,211,630, a process was disclosed by Tindall for obtaining nitromethane in high purity. According to this process, water and an alkane having from 6 to 8 carbon atoms are added to the crude nitroalkane mixture and a tertiary mixture consisting of nitromethane, alkane and water is distilled off and condensed and relatively pure nitromethane was recovered therefrom.

This process has been useful for preparing high purity nitromethane, but the water content has resulted in processing problems. Also, heretofore there has been no efficient method for separating nitromethane from a mixture with nitroethane and thereby upgrade the purity of nitroethane.

SUMMARY OF THE INVENTION

It is an object of this invention to provide an improved process for the purification of nitromethane and nitroethane.

It is another object of this invention to provide an improved method for obtaining nitromethane free from nitroethane.

It is still another object of this invention to provide a method for obtaining nitroethane substantially free from nitromethane.

Other objects of this invention will be apparent to those skilled in the art from the description herein.

A process has been discovered for the separation of a mixture of nitromethane and nitroethane. The new process makes it possible to obtain high purity nitromethane and an improved grade of nitroethane. According to the new process, pentane is added to the nitromethane-nitroethane mixture and the mixture is then distilled. The pentane is added in an amount sufficient to initiate co-distillation with the nitromethane. The distillate is condensed, and the condensate divides into 2 layers. The lower layer is substantially pure nitromethane of 99% or more, and the upper layer consists of pentane with about 4% nitromethane. The former is suitable for use as purified nitromethane and the pentane layer is suitable for recycle.

DETAILED DISCUSSION

According to the process of the present invention, pentane is added to the nitromethane-nitroethane mixture in an amount sufficient to initiate co-distillation with the nitromethane, generally about 1–4 parts by weight of pentane per part of nitromethane. If the nitromethane content is relatively high, less pentane is required because the upper layer distillate is returned to the column. Distillation is conveniently conducted in a column of 20 or more theoretical plates under total take-off. Distillation takes place at a vapor temperature of about 28–35° C. at atmospheric pressure, although it may vary somewhat depending upon the purity of the pentane and the particular isomer employed. It is very surprising that nitromethane, which has a boiling point of about 101° C. will co-distill with pentane at such a low temperature. It is also advantageous because nitromethane is relatively sensitive to detonation by shock at a temperature above about 60° C., so the present process offers a distinct safety advantage.

As previously described, the condensed distillate is conveniently collected in a decanter where it forms 2 layers. The upper layer, principally the pentane, can be returned to the column until all nitromethane has separated; the distillation is then continued to remove the pentane and is concluded when the nitroethane is free from pentane. The nitromethane layer contains a fraction of a percent of pentane which can be readily separated by redistilling. The nitromethane layer is, however, suitable for most uses without refining. The pentane layer contains 3–4% nitroalkane and is advantageously reserved for reuse.

When all of the pentane and nitromethane have been separated, the distillation residue is nitroethane of improved purity, substantially free from nitromethane.

The term co-distill is intended to mean the phenomenon whereby two or more materials vaporize from the application of heat to a mixture containing them. With reference to the present invention, the term co-distillation is intended to include, but not be limited to, azeotropic distillation.

The instant process is suitable for separating relatively small quantities, i.e., 1–5%, of nitromethane from nitroethane, or it can be used to separate the production stream where the ratio may be as much as 3:1 of NM:NE. It can also be used for the purification of commercial grade nitromethane which may contain 4–5% or more of nitroethane. Generally, it is contemplated that the process will be of greatest value in the purification of commercial grade nitroethane for special application, e.g., for the preparation of derivatives.

The pentane suitable for use in the practice of this invention is n-pentane or iso-pentane (2-methyl butane) or a mixture thereof. Commercial grade material is suitable. Preferably mixed isomers are employed because the raw material cost is generally less than for a pure isomer and the results are equally as satisfactory.

The process has been described in terms of batch distillations, but it will be readily apparent to those skilled in the art that the process can be easily adapted to continuous operation. Generally, the process will be operated at atmospheric pressure, but it is also operable at reduced pressures and correspondingly reduced temperatures. Such operation is deemed to be the equivalent of that at atmospheric pressure.

The following examples further illustrate the practice of this invention but it is not intended that the process be limited thereby.

EXAMPLE 1

A mixture of relatively pure nitromethane, 20 g. and nitroethane, 10.5 g., was prepared. It was then mixed with 79 g. of pentane (obtained by distillation of petroleum ether, taking the material distilling at 33–37° C.) and the mixture was distilled through a ¾" x 47" column packed wtih ⅛" single-turn glass helices, estimated equivalent to 17 theoretical plates. The distillate was condensed and collected in a 15 ml. decanter. The lower layer (NM) was continuously removed until it stopped separating. The vapor temperature at the start of distillation was 32° C. and dropped to as low as 28° C. during distillation, indicating that the pentane used consisted of mixed isomers.

The nitromethane layer, 19.7 g., had an analysis of 99.7% with 0.3% pentane. Distillation was continued at total take-off to a liquid temperature of 100° C., vapor temperature 37° C., to remove pentane. The one phase distillate consisted of 96% pentane, 3.8% nitroethane and 0.2% nitromethane. It was reserved for a subsequent repeat of the distillation process.

The residue consisted of nitroethane 88.1%, pentane 10.8% and nitromethane 1.1%. Distillation is continued to remove the pentane and remaining nitromethane to yield nitroethane substantially free from nitromethane.

EXAMPLE 2

The experiment of Example 1 is repeated except that n-pentane is employed in place of mixed isomers. The residual nitroethane is substantially free from nitromethane.

EXAMPLE 3

The experiment of Example 1 is repeated except that iso-pentane is employed in place of mixed isomers. The residual nitroethane is substantially free from nitromethane.

I claim:
1. A process for the separation of a mixture of nitromethane and nitroethane comprising the steps of:
  (a) adding n-pentane or iso-pentane or a mixture thereof to said nitromethane-nitroethane mixture in an amount sufficient to effect separation of said nitromethane,
  (b) heating said mixture to effect said separation by co-distillation of said nitromethane with said pentane thereby producing a distillate and a residue,
  (c) condensing said distillate thereby producing a condensate which divides into an upper layer and a lower layer, said lower layer comprising nitromethane substantially free from nitroethane, and separating said layers,
  (d) continuing said heating to effect distillation of pentane from said residue, thereby producing, as the residue, nitroethane substantially free from nitromethane.
2. The process of claim 1 wherein said pentane is n-pentane.
3. The process of claim 1 wherein said pentane is iso-pentane.
4. The process of claim 1 wherein said pentane is added in an amount of from about 1 to about 4 parts by weight per part of nitromethane.

References Cited

UNITED STATES PATENTS

| | | | |
|---|---|---|---|
| 2,465,959 | 3/1949 | Tindall | 203—70 |
| 2,597,027 | 5/1952 | Passino et al. | 260—644 |
| 3,211,630 | 10/1965 | Tindall | 260—644 |

WILBUR L. BASCOMB, JR., Primary Examiner

U.S. Cl. X.R.

203—71; 260—644